United States Patent
Covell et al.

(10) Patent No.: US 7,327,891 B2
(45) Date of Patent: Feb. 5, 2008

(54) AUTOMATIC SELECTION OF A VISUAL IMAGE OR IMAGES FROM A COLLECTION OF VISUAL IMAGES, BASED ON AN EVALUATION OF THE QUALITY OF THE VISUAL IMAGES

(75) Inventors: Michele M. Covell, Los Altos Hills, CA (US); Subutai Ahmad, Palo Alto, CA (US); Katerina L. Shiffer, Milpitas, CA (US)

(73) Assignee: YesVideo, Inc., Santa Clara, CA (US)

( * ) Notice: Subject to any disclaimer, the term of this patent is extended or adjusted under 35 U.S.C. 154(b) by 704 days.

(21) Appl. No.: 10/198,602

(22) Filed: Jul. 17, 2002

(65) Prior Publication Data

US 2003/0068100 A1     Apr. 10, 2003

(51) Int. Cl.
*G06K 9/62* (2006.01)
(52) U.S. Cl. .................. 382/224; 382/112; 382/118
(58) Field of Classification Search ............. 382/112, 382/128, 254, 255, 266, 118; 345/592, 700; 348/470; 355/32
See application file for complete search history.

(56) References Cited

U.S. PATENT DOCUMENTS

| | | | |
|---|---|---|---|
| 4,811,245 A | 3/1989 | Bunker et al. | 364/521 |
| 4,885,702 A * | 12/1989 | Ohba | 345/419 |
| 4,979,050 A | 12/1990 | Westland et al. | 360/14.1 |
| 5,089,887 A | 2/1992 | Robert et al. | 358/105 |
| 5,262,856 A | 11/1993 | Lippman et al. | 358/136 |
| 5,521,841 A | 5/1996 | Arman et al. | 364/514 A |
| 5,583,950 A | 12/1996 | Prokoski | 382/212 |
| 5,589,897 A * | 12/1996 | Sinclair et al. | 351/223 |
| 5,657,402 A | 8/1997 | Bender et al. | 382/284 |
| 5,719,964 A * | 2/1998 | Linzer et al. | 382/250 |
| 5,983,251 A | 11/1999 | Martens et al. | 708/203 |
| 6,052,485 A * | 4/2000 | Nelson et al. | 382/225 |
| 6,268,863 B1 * | 7/2001 | Rioux | 345/427 |
| 6,298,145 B1 * | 10/2001 | Zhang et al. | 382/103 |
| 6,829,384 B2 * | 12/2004 | Schneiderman et al. | 382/154 |
| 2003/0081249 A1 * | 5/2003 | Ahmad et al. | 358/1.15 |

* cited by examiner

*Primary Examiner*—Sheela Chawan
(74) *Attorney, Agent, or Firm*—David R. Graham

(57) ABSTRACT

The invention automatically evaluates the quality of the visual images in a collection of visual images and selects one or more visual image(s) from the collection based on the evaluation of the quality of the visual images.

46 Claims, 5 Drawing Sheets

| Digital Image | Digital Image | Digital Image | Digital Image | Digital Image | Digital Image | Digital Image | Digital Image |
|---|---|---|---|---|---|---|---|
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | Digital Image | Digital Image | Digital Image | Digital Image | Digital Image | Digital Image |
| Digital Image | Digital Image | | | | | | |

FIG. 1

| Digital Image | Digital Image | Uniform sampling between 5.30 and 6.00 | Digital Image |
| --- | --- | --- | --- |
| Digital Image | Digital Image | Uniform sampling between 28.00 and 28.30 | Digital Image |
| Digital Image | Digital Image | Uniform sampling between 34.00 and 34.30 | Digital Image |
| Digital Image | Digital Image | Uniform sampling between 50.30 and 51.00 | Digital Image |

| Digital Image | Digital Image | AutoSnap sampling between 5.30 and 6.00 | Digital Image | Digital Image |
|---|---|---|---|---|
| Digital Image | Digital Image | AutoSnap sampling between 28.00 and 28.30 | Digital Image | Digital Image |
| Digital Image | Digital Image | AutoSnap sampling between 34.00 and 34.30 | Digital Image | Digital Image |
| Digital Image | Digital Image | AutoSnap sampling between 50.30 and 51.00 | Digital Image | Digital Image |

AUTOMATIC SELECTION OF A VISUAL IMAGE OR IMAGES FROM A COLLECTION OF VISUAL IMAGES, BASED ON AN EVALUATION OF THE QUALITY OF THE VISUAL IMAGES

BACKGROUND OF THE INVENTION

1. Field of the Invention

This invention relates to selecting one or more visual images from a collection of visual images and, in particular, to selecting one or more visual images from a collection of visual images based on an evaluation of the quality of the visual images in the collection.

2. Related Art

It can be desirable to select one or more visual images from a collection of visual images. The selected visual image(s) can then be extracted from the collection of visual images and presented separately from the collection. For example, it may be desired to select one or more visual images from a visual recording (i.e., one or more series of visual images, each series of visual images acquired at a regular interval by a visual data acquisition apparatus such as a video camera and representing visual content that occurs over a period of time) so that the selected visual image(s) can be extracted and presented as a set of still visual image(s).

A visual image can be manually selected from a collection of visual images, i.e., a human views the visual images in the collection one by one and selects visual image(s) from the collection of visual images. However, manual selection of visual image(s) from a collection of visual images may be undesirably subjective. Further, even if the selection criteria used remain constant, the selection of visual images by a person may be executed inconsistently from visual image to visual image. Additionally, manual selection of visual image(s) from a collection of visual images may be undesirably tedious and cumbersome (and may be impractical), particularly when the collection of visual images is large (e.g., a videotape may include several hundred thousand images).

Visual images can be automatically selected from a collection of visual images. For example, visual images can be automatically selected from a collection of visual images by selecting visual images at regular intervals in the collection of visual images. For instance, visual images can be selected from a visual recording at regular time intervals (i.e., select an image every n seconds) or at regular image intervals (i.e., select every nth image). However, this "mechanical" approach does not take into consideration the characteristics of the visual images, either individually or as a collection, in selecting visual images from a collection of visual images. In some situations in which it is desired to select visual image(s) from a collection of visual images, it can be desirable to consider the characteristics of the visual images and/or the collection of visual images in deciding which visual images to select.

For example, the content of a visual recording can be evaluated to identify segments of visual images containing related content (e.g., scenes can be identified in the visual recording). In such case it is often desirable to identify a visual image (a "keyframe") to represent each visual recording segment. The set of keyframes are based on the content of the visual recording because each keyframe represents a scene, which is identified based on the visual recording content.

Keyframes can be selected based on a specified relationship to the corresponding scenes. For example, keyframes can be selected based on a specified relationship to other images in the scene (e.g., each keyframe is the nth image from the beginning or end of a scene, such as the first or last image of a scene). Or, for example, keyframes can be selected based on a specified temporal relationship to the scene (e.g., each keyframe is the image that occurs a specified time from the beginning or end of a scene).

Keyframes can also be selected based on an evaluation of the content of the visual images of a scene to identify a visual image that "best" represents the content of the scene. Selection of keyframes in this manner is described in, for example, commonly owned, co-pending U.S. patent application Ser. No. 09/792,280, entitled "Video Processing System Including Advanced Scene Break Detection Methods for Fades, Dissolves and Flashes," filed on Feb. 23, 2001, by Michele Covell et al., the disclosure of which is hereby incorporated by reference herein.

SUMMARY OF THE INVENTION

The invention automatically evaluates the quality of the visual images in a collection of visual images ("quality evaluation") and selects one or more visual image(s) from the collection based on the evaluation of the quality of the visual images. The invention can also be implemented to automatically evaluate the content of the visual images in the collection ("content evaluation"), in addition to the quality evaluation, and use the content evaluation in selecting the visual image(s). Additionally, when the collection of visual images is a visual recording (i.e., one or more series of visual images, each series of visual images acquired at a regular interval by a visual data acquisition apparatus such as a video camera and representing visual content that occurs over a period of time), the invention can also be implemented to automatically evaluate the position of the visual images in the collection ("position evaluation") and use the position evaluation in selecting the visual image(s). The invention can advantageously be used in situations in which the quality of visual images selected from a collection of visual images is deemed to be an important characteristic of the selected visual images. Further, the automatic selection of visual image(s) advantageously facilitates obtaining high quality visual images from a large collection of visual, images (e.g., a videotape, which may have several hundred thousand images).

A variety of quality evaluations can be used to enable selection of visual image(s) from a collection of visual images in accordance with the invention. For example, an image variation evaluation can be used by the invention to evaluate the amount of variation within an image. An image structure evaluation can be used by the invention to evaluate the amount of smoothness within an image. An inter-image continuity evaluation can be used by the invention to evaluate the degree of similarity between an image and the immediately previous image in a chronological sequence of images. An edge sharpness evaluation can be used by the invention to evaluate the amount of "edginess" (i.e., the presence of sharp spatial edges) within an image. An image luminance evaluation can be used by the invention to evaluate the amount of energy within a visual, image.

Similarly, a variety of content evaluations can be used in addition to the quality evaluations to select visual image(s) from a collection of visual images in accordance with the invention. For example, a face detection evaluation can be used by the invention to evaluate whether or not the image includes a recognizably human face. A flesh detection evaluation can be used by the invention to evaluate whether or not the image includes flesh. A mobile object evaluation can be used by the invention to evaluate whether or not the visual image includes an object that is, was, or will be moving relative to another object or objects (e.g., the ground) in the visual image. A camera movement evaluation can be used by the invention to evaluate whether or not a change occurred in the field of view of the video camera (or other visual recording data acquisition device) between the time of acquisition of a visual image currently being evaluated and the immediately previous visual image, or over a specified range of temporally contiguous visual images.

A variety of position evaluations can also be used in addition to the quality evaluations to select visual image(s) from a collection of visual images in accordance with the invention. For example, a potential keyframe evaluation can be used by the invention to evaluate whether a visual image is near the start of a defined segment (e.g., a shot or scene) of the visual recording. A transitional image evaluation can be used by the invention to evaluate whether the visual image occurs during a gradual shot change (e.g., a dissolve).

An evaluation in accordance with the invention of visual images in a collection of visual images can be used to categorize the visual images of the collection and the categorizations used to select visual image(s) from the collection. Visual images can be categorized into quality levels based on one or more evaluations. Visual images can also be categorized according to position based on one or more evaluations.

An evaluation in accordance with the invention of visual images in a collection of visual images can also be used to produce a score for individual visual images of the collection that indicates the desirability of selecting that visual image. The scores can then be used, perhaps with one or more other criteria, to select visual image(s) from the collection.

The invention can be used for a variety of purposes and in a variety of ways. The invention can be used to select and extract skill visual images from a high quality version of a visual recording, and present the high quality still visual images to a user together with a lower quality version of the visual recording (which may be produced so that the visual recording does not exceed the data storage capacity of a data storage medium on which the visual recording is to be stored). The invention can also be used to select and extract the still visual images from a visual recording, which are then processed to improve their quality and presented to a user together with a lower quality version of the visual recording. The invention can also be used to select and extract still visual images from a visual recording, which are then presented to a user instead of the visual recording. The invention can also be used to select still images from a visual recording, but present to a user only indices to the selected images together with the visual recording (the invention can be further implemented to enable the user to browse the visual recording using the indices, and can also be implemented to modify the indices by substituting one or more new visual images for originally selected visual image(s)).

BRIEF DESCRIPTION OF THE DRAWINGS

FIG. 1 illustrates a set of images selected and extracted from a visual recording in accordance with the invention.

FIG. 2 illustrates a set of 16 images selected and extracted from a visual recording at a regular time interval.

FIG. 3 illustrates a set of 16 images selected and extracted, in accordance with the invention, from the same visual recording from which the visual images of FIG. 2 were selected and extracted.

DETAILED DESCRIPTION OF THE INVENTION

Figure 4:
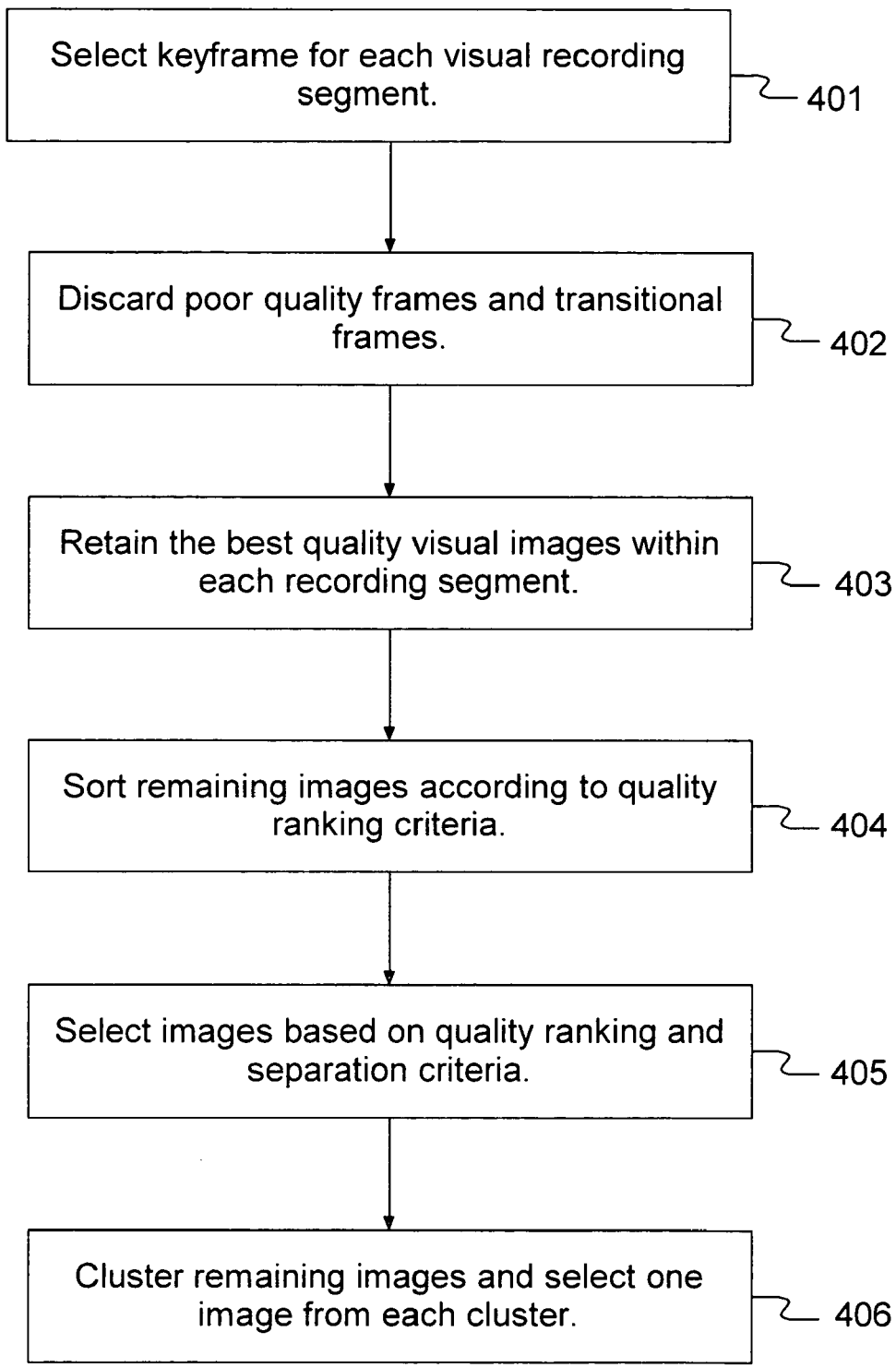
FIG. 4 is a flow chart of a method according to an embodiment of the invention for using categorization(s) of the visual images of a collection of visual images to select visual image(s) from the collection.

The invention automatically evaluates a collection (i.e., two or more) of visual images to select one or more visual images from the collection (hereinafter, for convenience, a selected image is sometimes referred to as an "autosnap image"). In particular, the invention automatically evaluates the quality of the visual images in the collection (a "quality evaluation") and selects the autosnap image(s) based on the evaluation of the quality of each visual image. (The "quality" of a visual image refers to the presence or absence of defects in the visual image, such as, for example, blurriness, aliasing, high contrast, bad exposure and absence of content, i.e., blank image.) The invention can also be implemented to automatically evaluate the content (i.e., subject matter) of the visual images in the collection (a "content evaluation"), in addition to the quality evaluation, and use the content evaluation in selecting the autosnap image(s). Additionally, when the collection of visual images is a visual recording, the invention can also be implemented to automatically evaluate the position of the visual images in the collection (a "position evaluation") and use the position evaluation in selecting the autosnap image(s).

The evaluation(s) of the collection of visual images can be used in a variety of ways to select one or more visual images from the collection. For example, the evaluation(s) can be used to categorize the visual images of the collection. The categorizations can then be used, perhaps with one or more other criteria, to select visual image(s) from the collection. Or, for example, the evaluation(s) can be used to produce a score for individual visual images of the collection that indicates the desirability of selecting that visual image. The scores can then be used, perhaps with one or more other criteria, to select visual image(s) from the collection. FIG. 1 illustrates a set of images selected and extracted from a visual recording in accordance with the invention.

The invention selects autosnap images by evaluating digital data representing the collection of visual images. The invention can also be used to select autosnap images from a collection of visual images represented by analog data by first converting the analog data into digital data (using techniques known to those skilled in the art). Each set of digital data representing a single visual image constitutes a "frame" and that term can be used herein to refer to a visual image. Each frame is comprised of an array of pixels that, typically, are each represented by multiple color components (e.g., RGB). The aspects of the invention described below can be implemented to operate on either color or grayscale image data. To enable more rapid processing of the visual image data, many aspects of the invention can also be implemented to operate on just the green component of RGB color image data, since the green component is often the most reliable indicator of visual image information (as known to those skilled in the art).

The invention can be used to select autosnap images from any collection of visual images. For example, the invention can be used to select autosnap images from a visual recording, such as a videotape. (Herein, a "visual recording" is one or more series of visual images, each series of visual images acquired at a regular interval by a visual data acquisition apparatus such as a video camera and representing visual content that occurs over a period of time. Further, for convenience, "video camera" is sometimes used herein to refer to all visual recording data acquisition apparatus.) Or, for example, the invention can also be used to select autosnap images from a collection of still visual images, such as a collection of digital photographs. Those skilled in the art will readily appreciate that there are other types of collections of visual images with which the invention can be used.

Some visual image evaluations that can be performed as part of the invention are "within-image" evaluations that evaluate only the image data within the visual image being evaluated, while other visual image evaluations are "between-image" evaluations that evaluate the image data from one or more other visual images (e.g., an adjacent visual image, or a series of visual images including or adjacent to the visual image being evaluated) in addition to the image data of the image being evaluated. The former type of visual image evaluation can be used in evaluating visual images from any collection of visual images, while the latter type of visual image evaluation is typically used in evaluating visual images from a visual recording.

The invention can advantageously be used to select high quality visual images from a collection of visual images. FIG. 2 illustrates a set of 16 images selected and extracted from a visual recording at a regular time interval. Many of the images are dark, blurry, or extremely similar to one another. FIG. 3 illustrates a set of 16 images selected and extracted, in accordance with the invention, from the same visual recording from which the visual images of FIG. 2 were selected and extracted. The images in FIG. 3 tend to be better exposed, sharper, and more distinct than the images in FIG. 2.

In general, the invention can make use of any visual image quality evaluation to enable selection of visual images from a collection of visual images. Some exemplary quality evaluations that can be used by the invention are described in detail below. Further, the invention can make use of a single visual image quality evaluation or any combination of visual image quality evaluations to enable selection of visual images from a collection of visual images. Some particular combinations of quality evaluations that can be used by the invention are described below. Additionally, when a combination of quality evaluations is used, the quality evaluations can be weighted to produce a desired amount of influence from each quality evaluation on the overall quality evaluation of a visual image.

One type of quality evaluation (the "image variation evaluation") that can be used by the invention evaluates the amount of variation within a visual image. (This visual image evaluation is a "within-image" evaluation.) When the variation in a visual image is relatively small, as the variation within the visual image increases, the likelihood that the visual image is partially or fully blank decreases, i.e., as the variation within an image increases, the quality (desirability) of the visual image increases. (When there is no variation in a visual image, the visual image is partially or fully blank; as the variation in the visual image increases, at some point the visual image can be said with near complete confidence to not be partially or fully blank.) The variation in a visual image can be evaluated by, for example, evaluating the variance in pixel values within the entire visual image and/or within one or more subsections of the visual image. The variation in a visual image can also be evaluated by, for example, evaluating the number of pixels that vary from a mean pixel value by more than a specified amount for the entire visual image and/or for one or more subsections of the visual image. In one embodiment of the invention, the variation in a visual image is evaluated by evaluating the variance in pixel values within the entire visual image and within a middle subsection of the visual image (e.g., the middle ninth of the visual image when the visual image is divided into nine equal sections), and evaluating the number of pixels that vary from a mean pixel value by more than a specified amount for the entire visual image and for subsections of the visual image (e.g., for each ninth of the visual image when the visual image is divided into nine equal sections).

Another type of quality evaluation (the "image structure evaluation") that can be used by the invention evaluates the amount of smoothness within a visual image. (This visual image evaluation is a "within-image" evaluation.) As the degree of smoothness within a visual image increases, the likelihood that the visual image is a "snow-like" noise image or other visual image without adequate internal structure decreases, i.e., as the degree of smoothness within a visual image increases, the quality (desirability) of the visual image increases. The smoothness of a visual image can be evaluated by, for example, evaluating the average first-order spatial correlation coefficient within the entire visual image and/or within one or more subsections of the visual image. In one embodiment of the invention, the smoothness of a visual image is evaluated by evaluating the average first-order spatial correlation coefficient within the entire visual image and within subsections of the visual image (e.g., within each ninth of the visual image when the visual image is divided into nine equal sections).

Another type of quality evaluation (the "inter-image continuity evaluation") that can be used by the invention evaluates the degree of similarity between a visual image and the immediately previous visual image in a chronological sequence of visual images. (This visual image evaluation is a "between-image" evaluation.) As the degree of similarity between a visual image and the immediately previous visual image increases, the likelihood that the visual image is blurry (due to, for example, camera motion or to many large object motions) or that the visual image has pronounced compression artifacts (due to, for example, the bandwidth required to encode their changed values) decreases, i.e., as the degree of similarity between a visual image and the immediately previous visual image increases, the quality (desirability) of the visual image increases. The degree of similarity between visual image and the immediately previous visual image can be evaluated by, for example, evaluating the change in grayscale texture pattern between the visual image and the immediately previous visual image. The degree of similarity between a visual image and the immediately previous visual image can also be evaluated by, for example, evaluating the change in the normalized color histogram between the visual image and the immediately previous visual image. The degree of similarity between a visual image and the immediately previous visual image can also be evaluated by, for example, evaluating motion vectors. In one embodiment of the invention, the degree of similarity between a visual image and the immediately previous visual image is evaluated by evaluating the change in magnitude of the grayscale pixel values between the visual image and the immediately previous visual image (e.g., by evaluating the percentage of pixels in the visual image for which the grayscale change between the visual image and the immediately previous visual image is above a specified threshold), and evaluating the temporal correlation coefficient between the visual image and the immediately previous visual image. In a further embodiment of the invention, the degree of similarity between a visual image and the immediately previous visual image is evaluated as in the previous embodiment and by further evaluating the change in normalized color histogram counts between the visual image and the immediately previous visual image for a specified histogram bin size.

Another type at quality evaluation (the "edge sharpness evaluation") that can be used by the invention evaluates the amount of "edginess" (i.e., the presence of sharp spatial edges) within a visual image. (This visual image evaluation is a "within-image" evaluation.) As the degree of "edginess" within a visual image increases, the likelihood that the visual image is blurry (due to, for example, poor focus or to large over- or under-exposed segments of the visual image) decreases, i.e., as the degree of "edginess" within a visual image increases, the quality (desirability) of the visual image increases. The degree of "edginess" within a visual image can be evaluated by, for example, evaluating the pixel count from a Sobel edge operator (e.g., identifying the percentage of edge pixels in the visual, image and determining whether the percentage of edge pixels in the visual image is greater than a specified percentage). The degree of "edginess" within a visual image can also be evaluated by, for example, evaluating the average first-order spatial, correlation coefficient for the visual image. The former tends to give a better measure at sharp edges, while the latter, although providing a less exact measure of "edginess," gives a more general characterization that can be used in other parts of the video processing (for example, in the image structure evaluation, discussed above).

Another type of quality evaluation (the "image luminance evaluation") that can be used by the invention evaluates the amount of energy within a visual image. (This visual image evaluation is a "within-image" evaluation.) As the amount of energy within a visual image becomes too high or too low, the likelihood that the visual image is overexposed ("washed out") or underexposed, respectively, increases, i.e., as the amount of energy within a visual image becomes too high or too low, the quality (desirability) of the visual image decreases. The energy within a visual image can be evaluated by, for example, evaluating the grayscale pixel values of the visual image and determining whether the grayscale pixel values are greater than a specified upper threshold amount or less than a specified lower threshold amount. For example, the average grayscale pixel value over the entire visual image can be compared to upper and lower thresholds for the entire visual image, or the grayscale pixel value for each pixel can be determined, compared to upper and lower thresholds for each pixel, and a determination made as to whether the grayscale pixel value of more than a specified number of pixels exceeds the upper or lower threshold.

As discussed above, the invention can be implemented to automatically evaluate the content of the visual images in the collection and use that evaluation in selecting the auto-snap image(s). The evaluation(s) of the content of the visual images identify characteristic(s) of the content of the visual image that are indicative of an image that is more likely than average to be of particular interest and therefore desirable to select for extraction from the collection of visual images. In general, the invention can make use of any visual image content evaluation to facilitate selection of visual images from a collection of visual images. Some exemplary content evaluations that can be used to facilitate selection of visual images from a collection of visual images are described in detail below. Further, the invention can make use of a single visual image content evaluation or any combination of visual image content evaluations to facilitate selection of visual images from a collection of visual images, and the content evaluation(s) can be combined with any single quality evaluation or any combination of quality evaluations. Some particular combinations of quality and content evaluations that can be used by the invention are described below. Additionally, the quality and content evaluations can be weighted to produce a desired amount of influence from each quality or content evaluation on the overall evaluation of a visual image.

One type of content evaluation (the "face detection evaluation") that can be used by the invention evaluates whether or not the image includes a recognizably human face. (This visual image evaluation—as well as the "flesh detection evaluation" described below—can be a "within-image" evaluation.) The evaluation of whether or not an image includes a recognizably human face can be accomplished using any of a variety of face detection methods (e.g., the FaceIt™ software produced by Indentix, Incorporated of Minnetonka, Minn.). The evaluation of whether or not an image includes a recognizably human face can further be implemented so that images determined to include a human face are further evaluated to identify aspects of the face, such as the size of the face, whether or not both eyes are visible and open, and/or the visibility and curvature of the mouth. An evaluation to identify aspects of a face in a visual image can also be accomplished using known face detection methods (e.g., the FaceStation™ software produced by Eyematic Interfaces, Inc. of Inglewood, Calif.). A similar type of content evaluation "flesh detection evaluation") that can be used by the invention evaluates whether or riot the image includes flesh. Flesh detection evaluation may be preferable to face detection evaluation, since the detection of flesh in an image can often be accomplished with more accuracy and since the presence of flesh may more reliably indicate that an image is of particular interest and therefore desirable to select for extraction from the collection of visual images (the simple presence of a person in an Image may be of paramount interest, rather than whether the person was looking at the camera or not).

Another type of content evaluation (the "mobile object evaluation") that can be used by the invention evaluates whether or not the visual image includes an object (e.g., person, animal, car) that is, was, or will be moving relative to another object or objects (e.g., the ground) in the visual image. (This visual image evaluation is a "between-image" evaluation.) The mobile object evaluation can be accomplished by evaluating whether coherent portions of the image do not match the motion (if any) of the video camera at some point during that motion.

Another type of content evaluation (the "camera movement evaluation") that can be used by the invention evaluates whether or not a change occurred in the field of view of the video camera between the time of acquisition of a visual image currently being evaluated (the current visual image) and the immediately previous visual image, or over a specified range of temporally contiguous visual images including the current visual image. (This visual image evaluation is a "within-image" evaluation.) A change in the field of view of the video camera can result from movement of the video camera (or a lens of the video camera) along any one or combination of three orthogonal translational axes (zoom, horizontal, vertical) and three orthogonal rotational axes (rotation, pan, tilt). Changing the field of view of the video camera often occurs as a result of a desire of the camera operator to begin recording content of particular interest, so that detection of camera movement tends to indicate that visual image(s) subsequent to, or during, the camera movement are of particular interest and are therefore desirable for selection. In one embodiment, camera movement evaluation can be accomplished by histogramming the image motion vector directions.

As discussed above, when the collection of visual images is a visual recording, the invention can be implemented to automatically evaluate the position of the visual images in the collection and use that evaluation in selecting the auto-snap image(s). The evaluation(s) of the position of the visual images evaluate whether the position of the visual image indicates that the visual image is more likely than average to be of particular interest and therefore desirable to select for extraction from the collection of visual images. In general, the invention can make use of any visual image position evaluation to facilitate selection of visual images from a collection of visual images. Some exemplary position evaluations that can be used to facilitate selection of visual images from a collection of visual images are described in detail below. Further, the invention can make use of a single visual image position evaluation or any combination of visual image position evaluations to facilitate selection of visual images from a collection of visual images, and the position evaluation(s) can be combined with any single quality evaluation, combination of quality evaluations, or combination of quality and content evaluations. Some particular combinations of position, quality and/or content evaluations that can be used by the invention are described below. Additionally, the position, quality and content evaluations can be weighted to produce a desired amount of influence from each position, quality or content evaluation on the overall evaluation of a visual image.

One type of position evaluation (the "potential keyframe evaluation") that can be used by the invention evaluates whether the visual image is near the start of a defined segment (e.g., a shot or scene) of the visual recording. A visual image near the start of a defined segment of the visual recording is more likely than average to be of particular interest and is therefore desirable to select for extraction from the collection of visual images. Whether a visual image is near the start of a defined segment of the visual recording can be evaluated by, for example, evaluating whether the visual image occurs within a specified duration of time from the beginning of the defined segment (e.g., within the first 5 seconds of a shot or scene).

Another type of position evaluation (the "transitional image evaluation") that can be used by the invention evaluates whether the visual image occurs during a gradual shot change (e.g., a dissolve). A visual image that occurs during a gradual shot change is less likely than average to be of particular interest and is therefore not desirable to select for extraction from the collection of visual images. Whether a visual image occurs during a gradual shot change can be determined using known techniques, such as, for example, a method described in the above-referenced U.S. patent application Ser. No. 09/792,280.

The invention can be implemented to use different types or combinations of types of evaluations, or an evaluation or combination of evaluations can be implemented In a different way, for different collections of visual images. This may be done, for example, in order to increase the likelihood of selecting desirable visual image(s) from the collection of visual images. This can be accomplished directly by selecting the evaluation(s) to be used and/or specifying the manner in which one or more evaluations are implemented. Further, the particular purpose or subject matter of a collection of visual images can make it desirable to implement the invention in a different way (e.g., using different types or combinations of types of evaluations, or implementing an evaluation or combination of evaluations in a different way) than that in which the invention is implemented for a collection of visual images having a different purpose and/or subject matter, in order to increase the likelihood of selecting desirable visual image(s) from the collection. For example, the invention can (but need not necessarily) be implemented for use with home, vacation, and personal event (e.g., wedding) videos in a different way than the invention is implemented for use with scientific documentation videos. The evaluation(s) and/or implementation of evaluation(s) used in an embodiment of the invention can be tailored to fit the purpose and/or subject matter of a collection of visual images if the purpose and/or subject is known beforehand.

As discussed above, an evaluation in accordance with the invention of visual images in a collection of visual images can be used to categorize the visual images of the collection and the categorizations used to select visual image(s) from the collection. In one embodiment of the invention, one or more evaluations are made of the visual images in a collection of visual images and the visual images categorized into quality levels based on the evaluation(s). In another embodiment of the invention, one or more evaluations are made of the visual images in a collection of visual images and the visual images categorized according to position based on the evaluation(s). In yet another embodiment of the invention, a first set of one or more evaluations are made of the visual images in a collection of visual images and the visual images categorized into quality levels based on the first set of evaluations, and a second set of one or more evaluations are made of the visual images and the visual images categorized according to position based on the second set of evaluations. Each of these embodiments of the invention can be implemented so that evaluation(s) can result in none of the categories being associated with the visual image (see, e.g., the description below of a particular embodiment of categorizing visual images according to position).

In a particular implementation of the embodiment of the invention in which visual images are categorized into quality levels, the visual images are categorized into three categories: "preferred" (the best quality images), "poor" (the worst quality images) and "marginal" (images having a quality between preferred and poor). The categorization of visual images into quality levels can be based on one or multiple evaluations. Particular ways in which the quality and content evaluations described above can be implemented to categorize visual images according to quality are described below. Particular ways in which the quality level categorizations produced by multiple quality and/or content evaluations can be combined to produce an overall quality level categorization for a visual image are also described below.

In the description below, magnitudes of pixel values are sometimes given in describing particular embodiments of the invention. Those pixel magnitudes are given for images having a pixel resolution in which each pixel can have a value from 0 to $2^{16}$ (i.e., 65,536). Those skilled in the art will readily understand how the particular pixel magnitudes given herein should be modified for use with images having other pixel resolutions.

As discussed above, one type of quality evaluation that can be used by the invention is the image variation evaluation. As also discussed above, image variation can be evaluated by evaluating the variance in pixel values within an entire image and/or within one or more subsections of the image (e.g., a middle subsection of the image, such as the middle ninth of the image when the image is divided into nine equal sections). Illustratively, when the invention is implemented so that an image variation evaluation is performed, the invention can be further implemented so that the variance across an entire visual image must be at least 400 for the visual image to be categorized as a "marginal" or "preferred" quality visual image, the variance across the entire visual image must be at least 500 for the visual image to be categorized as a "preferred" quality visual image, the variance within the middle ninth of the visual image's area must be at least 75 for the visual image to be categorized as a "marginal" or "preferred" quality visual image, and/or the variance within the middle ninth of the visual image's area must be at least 500 for the visual image to be categorized as a "preferred" quality visual image. As also discussed above, image-variation can also be evaluated by evaluating the number of pixels that vary from a mean pixel value by more than a specified amount for the entire image and for subsections of the image (e.g., for each ninth of the image when the image is divided into nine equal sections). Illustratively, when the invention is implemented so that an image variation evaluation is performed, the invention can be further implemented so that at least 85% of the pixels in the entire image must vary by 8 or more levels from the average color of the entire image for the visual image to be categorized as a "marginal" or "preferred" quality visual image, at least 95% of the pixels in the entire image must vary by 8 or more levels from the average color of the entire image for the visual image to be categorized as a "preferred" quality visual image, at least 30% of the pixels within the middle ninth of the visual image's area must vary by 8 or more levels from the average color of the entire image for the visual image to be categorized as a "marginal" or "preferred" quality visual image, at least 85% of the pixels within the middle ninth of the visual image's area must vary by 8 or more levels from the average color of the entire image for the visual image to be categorized as a "preferred" quality visual image, at least 15% of the pixels within any ninth of the visual image s area must vary by 8 or more levels from the average color of the entire image for the visual image to be categorized as a "marginal" or "preferred" quality visual image, and/or at least 50% of the pixels within any ninth of the visual image's area must vary by 8 or more levels from the average color of the entire image for the visual image to be categorized as a "preferred" quality visual image. Further, when the invention is implemented so that an image variation evaluation is performed, the invention can be implemented using any combination of the above-described constraints on image variation to categorize the quality level of a visual image. In a particular embodiment of the invention, all of the above-described constraints on image variation are used to categorize the quality level of a visual image.

As discussed above, another type of quality evaluation that can be used by the invention is the image structure evaluation. As also discussed above, image structure can be evaluated by evaluating the average first-order spatial correlation coefficient within an entire image and/or within one or more subsections of the image (e.g., within each ninth of the image when the image is divided into nine equal sections). Illustratively, when the invention is implemented so that an image structure evaluation is performed, the invention can be further implemented so that the average first-order spatial correlation coefficient within an entire image must be at least 0.5 for the visual image to be categorized as a "marginal" or "preferred" quality visual image, the average first-order spatial correlation coefficient within an entire image must be at least 0.8 for the visual image to be categorized as a "preferred" quality visual image, and/or the average first-order spatial correlation coefficient within any ninth of the visual image's area must be at least 0.5 for the visual image to be categorized as a "marginal" or "preferred" quality visual image.

As discussed above, another type of quality evaluation that can be used by the invention is the inter-image continuity evaluation. As also discussed above, inter-image continuity can be evaluated by evaluating the change in magnitude of the grayscale pixel values between the image and the immediately previous image, and evaluating the temporal correlation coefficient between the image and the immediately previous image. Illustratively, when the invention is implemented so that an inter-image continuity evaluation is performed, the invention can be further implemented so that at least 20% of the pixels must be within 32 of the level seen at the corresponding location in the previous image, at least 5% of the pixels must be within 8 of the level seen at the corresponding location in the previous image, and the first-order temporal correlation coefficient between the current and previous image must be at least 0.5 for the visual image to be categorized as a "marginal" or "preferred" quality visual image. As also discussed above, inter-image continuity can be further evaluated by evaluating the change in normalized color histogram counts between the image and the immediately previous image for a specified histogram bin size. Illustratively, when the invention is implemented so that an inter-image continuity evaluation is performed as described above, the invention can be further implemented so that, when the histogram bin size is 6% of the normalized variation range, 20% or fewer of the normalized color histogram counts can vary between the image and the immediately previous image for the visual image to be categorized as a "marginal" or "preferred" quality visual image.

As discussed above, another type of quality evaluation that can be used by the invention is the edge sharpness evaluation. As also discussed above, edge sharpness can be evaluated by evaluating the average first-order spatial correlation coefficient for the image. Illustratively, when the invention is implemented so that an edge sharpness evaluation is performed, the invention can be further implemented so that the average first-order spatial correlation coefficient for the image must be less than or equal to 0.99 for the visual image to be categorized as a "marginal" or "preferred" quality visual image, and/or the average first-order spatial correlation coefficient for the image must be less than or equal to 0.97 for the visual image to be categorized as a "preferred" quality visual image.

The invention can be implemented so that the visual images of a collection of visual images are categorized into quality levels based on a single quality evaluation (e.g., using any of the particular embodiments described above for various types of quality evaluations) or on multiple quality evaluations. In the latter case, the results of the quality evaluations must be combined in some way. This can be done, for example, by determining a quality categorization based on each quality evaluation, then deriving an overall quality categorization from the individual quality categorizations. For instance, the invention can be implemented so that a visual image is given an overall categorization of "preferred" only if all of the individual quality categorizations of the visual image are "preferred." Or, for instance, the invention can be implemented so that a visual image is given an overall categorization of "preferred" if a majority (or 50% or more) of the individual quality categorizations of the visual image are "preferred." Or, for instance, the invention can be implemented so that a visual image is given an overall categorization of "preferred" if a single individual quality categorization of the visual image is "preferred." The invention can also be implemented so that the quality evaluations are combined in some manner to directly produce a quality categorization based on all of the quality evaluations.

The invention can also be implemented so that the results of one or more content evaluations are used to affect a quality categorization based on one more quality evaluations. There are many particular ways in which this can be done; however, in general, satisfaction of the criter(ia) of a content evaluation will tend to cause a visual image to be categorized in a higher quality category (indicating a better quality image). For example, when the invention is implemented so that visual images are categorized into three quality levels—"preferred," "marginal," and "poor"—the invention can be further implemented so that if the criter(ia) of one or more content evaluations are satisfied, an image having an overall categorization of "marginal" quality (each of the quality evaluations produce a categorization of "marginal" or "preferred" quality, and at least one of the quality evaluations produce a categorization of "marginal" quality) can be categorized as having "preferred" quality instead.

As discussed above, the invention can be embodied to categorize visual images according to position. In a particular implementation of such an embodiment of the invention, the visual images can be categorized as a "potential keyframe" (i.e., a visual image that occurs within a specified duration of time from the beginning of a defined segment) or not. In another particular implementation of such an embodiment of the invention, the visual images can be categorized as a "transitional image" (i.e., a visual image that occurs during a gradual shot change) or not. In yet another particular implementation of such an embodiment of the invention, the visual images can be categorized as a "potential keyframe," a "transitional image," both a "potential keyframe" and a "transitional image," or neither a "potential keyframe" or a "transitional image."

As discussed above, in embodiments of the invention in which visual images are categorized, the categorizations can be used to select visual image(s) from the collection. FIG. 4 is a flow chart of a method 400 according to an embodiment of the invention for using categorization(s) of the visual images of a collection of visual images to select visual image(s) from the collection. The method 400 can be used when the collection of visual images is a visual recording. Prior to operation of the method 400, visual recording segments (e.g., scenes, shots) are identified in the visual recording. (The visual recording segments can be identified using any appropriate method, a number of which are known to those skilled in the art: for example, scenes can be identified in a visual recording using a method as described in the above-referenced U.S. patent application Ser. No. 09/792,280; as indicated above, the disclosure of that application is incorporated by reference herein.) Additionally, prior to operation of the method 400, the visual images are categorized according to position as a potential keyframe and/or a transitional image, or neither, as discussed in more detail above. Further, prior to operation of the method 400, the visual images are categorized into three quality levels: "preferred," "marginal," and "poor," as also discussed in more detail above.

First, in step 401 of the method 400, a single keyframe is selected for each visual recording segment. This is done for each visual recording segment by evaluating the visual image(s) that have been categorized as a "potential keyframe" in that visual recording segment. In one implementation of the step 401, a keyframe is selected for a visual recording segment as follows. First, visual images categorized as a potential keyframe that have also been categorized as a transitional image are eliminated (unless all visual images in the visual recording segment that have been categorized as a potential keyframe have also been categorized as a transitional image). From the visual image(s) remaining after elimination of those categorized as transitional images, all but the visual image(s) having the highest quality level categorization are eliminated, i.e., all but visual image(s) of preferred quality are eliminated or, if there are no visual images of preferred quality, all but visual image(s) of marginal quality are eliminated (if there are no visual images of preferred or marginal quality, no visual images are eliminated). Finally, from these remaining visual images, a keyframe is selected so as to maximize specified ranking criteria. For example, the keyframe can be selected as the visual image having color that is closest to the overall scene average color, measured on a 3×3 grid of scene average colors, each entry in the grid being the scene average color for a corresponding ninth of the visual image area (the distance of the color of a visual image from the overall scene average color is determined as a weighted sum of the differences for each of the grid entries.) This keyframe selection criterion can be modified by giving priority to visual images that include a recognizable face (which can be identified using a face recognition method, as described above) and, among the face-containing visual images, giving further priority to visual images including a face with a "pleasant" facial expression or a face containing two open eyes (which can be determined using known expression recognition methods such as implemented in, for example, the FaceStation™ software discussed above). Priority can be given to visual images including a face or a face with a particular expression by calculating a score for both the image color difference measure and the face detection measure, and determining an overall score as a linear weighted sum of those scores (increasing the weight of the face detection measure gives priority to visual images including a face).

In step 402 of the method 400, all of the visual images from the visual recording other than keyframes as selected above are considered and those that are categorized as "poor" quality or as a transitional image are discarded from further consideration.

In step 403 of the method 400, from the remaining visual images within each visual recording segment, only the best quality visual images in each visual recording segment are retained for further consideration. That is, if there are one or more "preferred" quality visual images among the remaining visual images in a visual recording segment, then all of the "marginal" quality visual images within that visual recording segment are discarded from further consideration.

In step 404 of the method 400, the remaining images within each visual recording segment are sorted according to one or more quality-ranking criteria. In one implementation of the step 404, quality evaluations used in the initial categorization of images into preferred, marginal and poor categories are combined into a single quality measure using the log ratio of probabilistic models of the distributions of "good" images and of "poor" images. What constitutes a "good" image and a "poor" image is established by creating a training set of visual images which have been sorted by a human into "good," "poor," or "unclassified" visual images, and determining a probabilistic model of "good" and "poor" images from the training set using well known statistical means. The probabilistic models can be, for example, a mixture of Gaussian distribution. In another implementation of the step 404, the results of face and expression recognition methods are combined with the quality evaluations used in the initial categorization of images into preferred, marginal and poor categories. For example, the quality ranking of an image can be improved if a recognizable face is found in the image and can be improved even more if the facial expression is "pleasant" (e.g., not blinking, not grimacing, not gape-mouthed).

In step 405 of the method 400, a greedy algorithm is used to select visual images from the list of sorted visual images that also satisfy some separation criteria. The separation criteria can be, for example, simply a time separation (e.g., ½ second) of a visual image from other selected visual images. In one implementation of the step 405, the highest ranked visual images that satisfy the separation criteria are selected. In another implementation of the step 405, the visual images that satisfy the separation criteria are selected irrespective of the quality ranking, then, if the number of selected visual images is less than desired, the highest ranked remaining visual images are selected. In the latter case, secondary separation criteria (which would impose a looser constraint) could be applied at the time of selecting visual images based on the quality ranking. In fact, the step 405 could be implemented so that, as long as the number of selected visual images is less than desired, visual images are selected by iteratively considering the visual images in order of ranking using increasingly loose separation criteria.

In step 406 of the method 400, the visual images remaining after the step 406 are clustered (using, for example, k-means clustering) and only one visual image from each cluster is selected as an autosnap image. In one implementation of the step 406, the clustering is done based on the differences in average color between visual images, measured on a 3×3 grid of average colors, each entry in the grid being averaged over one ninth of the visual image (the difference is determined as a weighted sum of the differences for each of the grid entries). The cluster can be modified by increasing the likelihood of including in the same cluster visual images that include the same face (which can be determined using a face recognition method) and by increasing the likelihood further of including in the same cluster visual images that include the same face determined to have a similar facial pose and expression (which can be determined using expression recognition).

As discussed above, an evaluation in accordance with the invention of visual images in a collection of visual images can be used to produce a score for individual visual images of the collection that indicates the desirability of selecting that visual image, and the scores used to select visual image(s) from the collection. The invention can be implemented so that the score is based on a single evaluation (e.g., using any of the particular embodiments described above for various types of quality evaluations) or on multiple evaluations (e.g., using any combination of the particular embodiments described above for various types of quality and content evaluations, including at least one quality evaluation). When the score is based on multiple evaluations, the multiple evaluations must be combined in some way. This can be done, for example, by determining a score based on each evaluation, then combining the individual scores for each evaluation to produce an overall score. For example, the overall score can be a linear combination of the individual scores, the individual scores each being given an equal weight in the combination or the individual scores being weighted to produce a desired emphasis on each evaluation. This can also be done by combining the evaluations in some manner to produce a single score. For example, in a manner similar to that described above for implementing the step 404 of the method 400 to sort visual images according to one or more quality-ranking criteria, the evaluations can be combined into a single quality measure using the log ratio of probabilistic models (which can be a mixture of Gaussian distribution) of the distributions of "good" images and of "poor" images. Scores determined using a mixture of Gaussian distributions can have either a negative or positive score: an increasingly negative score indicates an increasingly poor quality image and an increasingly positive score indicates an increasingly high quality image.

Once a score is determined for each visual image, the scores are used to select visual image(s) from the collection of visual images. In one embodiment of the invention, the visual images with the highest scores are selected. However, the foregoing embodiment can result in selection of visual images from one or a few small sections of the collection of visual images (e.g., are bunched in one or a few small sections of a visual recording). It can be desirable to ensure that the visual images selected come from a wide variety of sections of the collection of visual images (e.g., are dispersed throughout all of a visual recording). When the collection of visual images is a visual recording, the ivention can be embodied so that at least a specified number of visual images must be selected from each of multiple visual recording segments (e.g., to ensure that a specified number of visual images are selected if row each scene). Or, the invention can be embodied to favor selection of visual images from a visual recording segment from which few or no visual images would otherwise be selected. Similarly, the invention can be embodied so that no more than a specified number of visual images can be selected from each visual recording segment, or to disfavor selection of visual images from a visual recording segment from which many visual images would otherwise be selected. In a particular embodiment of the invention for use in selecting visual images from a visual recording, at least one visual image must be selected from cacti scene. In another embodiment of the invention for use in selecting visual images from a visual recording (which can be used together with the immediately previous embodiment or alone), a minimum and/or maximum number of selected visual images is established for each scene in accordance with the duration of the scene, i.e., the longer the scene, the greater the minimum and/or maximum number of visual images that must be selected from that scene. For example, in a particular embodiment of the invention, the maximum number of visual images (expressed as a percentage of the total number of visual images to be selected from the visual recording) that can be selected from a scene is some multiple (e.g., 2 or 3) of the duration of the scene (expressed as a percentage of the total duration of the visual recording).

Figure 5:
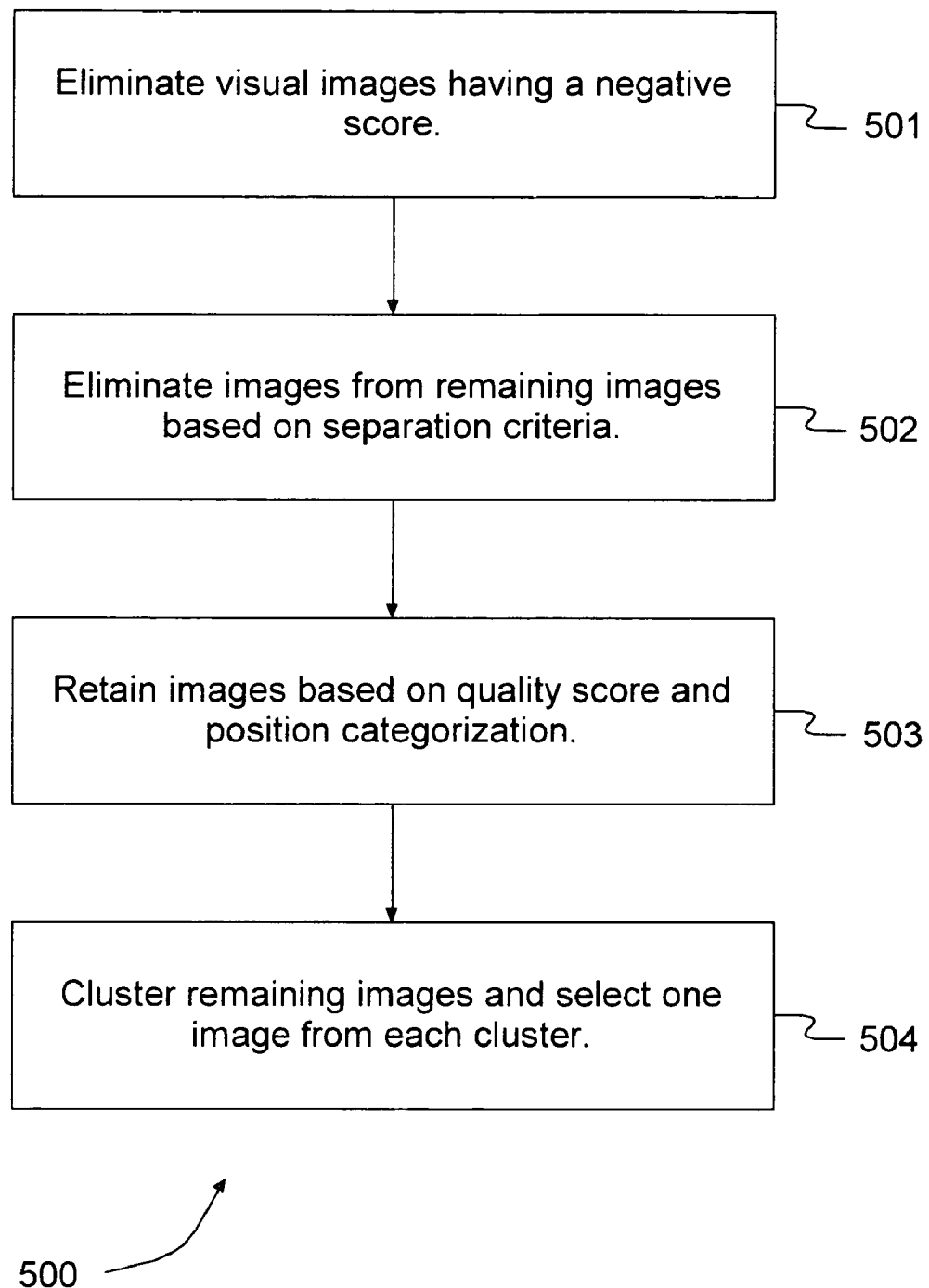
FIG. 5 is a flow chart of a method according to an embodiment of the invention for using scores for the visual images of a collection of visual images to select visual image(s) from the collection.

As discussed above with respect to selection of visual images based on categorization (see the discussion above of step 405 of the method 400), it can be desirable to select visual images in accordance with separation criteria. FIG. 5 is a flow chart of a method 500 according to an embodiment of the invention for using scores for the visual images of a collection of visual images to select visual image(s) from the collection.

In step 501 of the method 500, all visual images having a negative score are eliminated, subject to the minimum visual image limitation for each scene (visual images having the least negative scores can be used to make up any deficiency in the number of visual images from a scene). Typically, many more visual images will remain than it is desired to select from the visual recording (typically, after the first pass, approximately half of the visual images from the collection remain).

In step 502 of the method 500, the separation between each temporally adjacent pair of visual images is determined for the remaining visual images. Whenever a separation between two visual images is less than a specified amount (e.g., 0.5 seconds), the visual image having the lower score is eliminated.

In step 503 of the method 500, the remaining visual images are evaluated using a combination of the score and the positional categorization (as discussed above). For example, the invention can be implemented so that all potential keyframes are retained regardless of the score(s) for those visual image(s). Or, for example, the invention can be implemented so that, a keyframe can be determined for each scene from the potential keyframes for that scene, and the keyframe visual image retained regardless of score. Or, for example, the invention can be implemented so that each visual image categorized as a transitional image is eliminated regardless of score (this can be combined with retention of visual images categorized as a potential keyframe or keyframe). Visual images categorized as neither a potential keyframe or transitional image are reviewed and the visual images with the highest scores necessary to retain a specified number of visual images for each scene are retained. The invention can also be implemented so that categorization of a visual image as a keyframe, potential keyframe or transitional image is used to increase or decrease the score for that visual image.

Finally, in step 504 of the method 500, the remaining visual images are clustered and a single visual image selected from each cluster is selected as an autosnap image. This can be done in the same manner as described above for the step 406 of the method 400.

The number of visual images to be selected from a collection of visual images can be specified prior to operation of the invention. In that case, the steps of the method 400, the method 500, or other method for selecting visual images using previous categorization(s) of, or scores associated with, the visual images in the collection are only performed until the desired number of visual images has been selected. However, typically, the number of visual images retained after step 405 of the method 400 or step 503 of the method 500 is still many more than the number of visual images that it is desired to select as autosnap images. In that case, the number of clusters formed in step 406 of the method 400 or step 504 of the method 500 can be specified to produce the specified number of selected visual images.

Selection of images can be done iteratively and hierarchically. For example, each of m videos (e.g., 10 videos) can be evaluated to select n images (e.g., 200) for each video, producing mm images (e.g., 2000 Images). The nm images are then evaluated to select p images (e.g., 50 images or 100 images).

Two or more quality and/or content evaluations can be highly correlated. Performing each of multiple highly correlated evaluations is redundant (i.e., can be viewed as evaluating the same or similar image characteristic(s) multiple times) and may undesirably influence the selection of visual images by unduly emphasizing particular characteristics of the visual images. Thus the invention can be implemented so that cross-correlation(s) are performed between two or more quality and/or content evaluations, and, it the results of the evaluations are highly correlated, only one of the evaluations is used in selecting visual images from the collection of visual images. In one embodiment of the invention, each of the quality evaluations (and, if used, content, evaluation(s)) is cross-correlated with each other evaluation. In another embodiment of the invention, only a subset of the possible pairs of evaluations are cross-correlated, the subset being selected empirically as those pairs which are known from experience to be most likely to be highly correlated. (The size of the subset can vary depending on the number of evaluations that can be cross-correlated; in general, as the number of evaluations increases, it is desirable to increase the number of cross-correlations done.) The latter embodiment can be advantageous because it can significantly reduce the computational burden associated with performing the cross-correlations.

Autosnap images selected from a collection of visual images can be used for a variety of purposes and in a variety of ways. For example, often, due to data storage media limitations (e.g., the storage capacity of CD-ROMs), it is impossible or impractical to store a high quality version of a visual recording on a data storage medium for provision to an end-user to enable viewing and manipulation. In accordance with the invention, the high quality version of the visual recording can be generated and stored just long enough to enable automatic selection and extraction of "good" images that can be stored on a data storage medium (to be provided to an end-user) as still images together with a medium quality version of the visual recording. The medium quality version of the visual recording is adequate for video streaming, while the still images enable viewing and manipulation of particular content (which will often be of particular interest) using a high quality representation of that content.

The invention can also be used to produce still images from a visual recording that are of better quality than that of the original visual recording. The invention is used to select and extract the still images, which are processed to improve their quality. Again, both the lower quality visual recording and the higher quality still images can be stored on a data storage medium for provision to an end-user. Automatically determining the still images to improve has the advantage of allowing the necessary processing to take place before an end-user is involved, which allows the latency of the processing to be arbitrarily long without affecting the end-user's experience. Automatically determining the still images to improve also allows the necessary processing to be completed in a more controlled processing environment (e.g., on a processor with a well-known speed and memory capacity), since the processing can take place on a computer operated by a vendor rather than on a computer operated by an end-user.

The invention can also be used to select and extract still images from a visual recording, which are then provided to an end-user instead of the visual recording. In this case, only the still images from the visual recording (or the still images plus the audio track from the visual recording or other audio recording intended to accompany the still images) are stored on a data storage medium that is provided to the end-user.

The invention can also be used to select still images from a visual recording, but store on a data storage medium to be provided to an end-user only indices to the selected images together with the visual recording. The end-user can use the indices as a guide to potentially interesting images or scenes within the visual recording. Further, the end-user can be enabled to fine tune the indices to quickly access better or more relevant images or scenes.

The selected and extracted visual images can be presented in any desired manner. For example, the images can be ordered temporally. The images can also be ordered based on the score for each image (e.g., images presented in order of decreasing score).

The selected and extracted images can also be used to create a highlights video (i.e., a summarized video) that includes short video segments that each contain one or more of the selected images.

The invention can be implemented, for example, by one or more computer programs and/or data structures including instruction(s) and/or data for accomplishing the functions of the invention. For example, such computer program(s) and/or data structures can include instruction(s) and/or data for performing the evaluations of visual images (quality evaluations, content evaluations, position evaluations), categorizing visual images, selecting visual images based on categorization of the visual images in a collection of visual images, determining a score for visual images, selecting visual images based on scores for the visual images in a collection of visual images, and performing cross-correlations to identify redundant visual image evaluations. Those skilled in the art can readily implement the invention using one or more computer program(s) and/or data structures in view of the description herein.

Various embodiments of the invention have been described. The descriptions are intended to be illustrative, not limitative. Thus, it will be apparent to one skilled in the art that certain modifications may be made to the invention as described herein without departing from the scope of the claims set out below.

We claim:

1. A method for automatically selecting one or more visual images from a collection of visual images, comprising the steps of:
    automatically evaluating the quality of each visual image in the collection of visual images; and
    automatically selecting one or more visual images from the collection of visual images, wherein the selection is based only on the evaluation of the quality of each visual image in the collection.

2. A method as in claim 1, wherein the step of automatically evaluating the quality of each visual image further comprises the step of automatically evaluating the amount of variation within each visual image.

3. A method as in claim 1, wherein the step of automatically evaluating the quality of each visual image further comprises the step of automatically evaluating the amount of smoothness within each visual image.

4. A method as in claim 1, wherein:
    the collection of visual images is a chronological sequence of images; and
    the step of automatically evaluating the quality of each visual image further comprises the step of automatically evaluating the degree of similarity between each visual image and the immediately previous image.

5. A method as in claim 1, wherein the step of automatically evaluating the quality of each visual image further comprises the step of automatically evaluating the presence of sharp spatial edges within each visual image.

6. A method as in claim 1, wherein:
    the collection of visual images is a chronological sequence of images; and
    the step of automatically evaluating the quality of each visual image further comprises the steps of:
        automatically evaluating the amount of variation within each visual image;
        automatically evaluating the amount of smoothness within each visual image;
        automatically evaluating the degree of similarity between each visual image and the immediately previous image; and
        automatically evaluating the presence of sharp spatial edges within each visual image.

7. A method as in claim 6, wherein the step of automatically evaluating the quality of each visual image further comprises the step of automatically evaluating the amount of energy within each visual image.

8. A method as in claim 1, further comprising the step of automatically evaluating the content of each visual image in the collection of visual images, and wherein the selection of one or more visual images from the collection of visual images is further based on the evaluation of the content of each visual image of the collection.

9. A method as in claim 8, wherein the step of automatically evaluating the content of each visual image further comprises the step of automatically evaluating whether or not each visual image includes a recognizably human face.

10. A method as in claim 8, wherein the step of automatically evaluating the content of each visual image further comprises the step of automatically evaluating whether or not each visual image includes human flesh.

11. A method as in claim 8, wherein the step of automatically evaluating the content of each visual image further comprises the step of automatically evaluating whether or not each visual image includes an object that is, was, or will be moving relative to another object or objects in the visual image.

12. A method as in claim 8, wherein:
    the collection of visual images a chronological sequence of images acquired by a visual data acquisition device; and
    the step of automatically evaluating the content of each visual image further comprises the step of automatically evaluating whether or not a change occurred in the field of view of the visual data acquisition device between the time of acquisition of a current visual image and the immediately previous visual image, or over a specified range of temporally contiguous visual images including the current visual image.

13. A method as in claim 1, further comprising the step of automatically evaluating the position of each visual image in the collection of visual images, and wherein the selection of one or more visual images from the collection of visual images is further based on the ovaluation of the position of each visual image in the collection.

14. A method as in claim 13, wherein the step of automatically evaluating the position of each visual image further comprises the step of automatically evaluating whether the visual image is near the start of a defined segment of the visual recording.

15. A method as in claim 13, wherein the step of automatically evaluating the position of each visual image further comprises the step of automatically evaluating whether the visual image occurs during a gradual shot change.

16. A method as in claim 1, further comprising the step of categorizing the visual images, wherein the visual image categorization is based on the quality evaluation.

17. A method as in claim 16, wherein the visual image categorization is based on image variation.

18. A method as in claim 16, wherein the visual image categorization is based on image structure.

19. A method as in claim 16, wherein the visual image categorization is based on inter-image continuity.

20. A method as in claim 16, wherein the visual image categorization is based on edge sharpness.

21. A method as in claim 16, further comprising the step of automatically evaluating the content of each visual image in the collection of visual images, and wherein the visual image categorization is further based on the content evaluation.

22. A method as in claim 16, wherein the step of categorizing further comprises the step of categorizing the visual images into quality levels.

23. A method as in claim 22, further comprising the step of automatically evaluating the position of each visual image in the collection of visual images, and wherein the visual image categorization is further based on the position evaluation.

24. A method as in claim 23, wherein the step of categorizing further comprises the step of categorizing the visual images as a potential keyframe or not.

25. A method as in claim 23, wherein the step of categorizing further comprises the step of categorizing the visual images as a transitional image or not.

26. A method as in claim 16, wherein the step of automatically selecting one or more visual images further comprises the step of automatically selecting the one or more visual images based on the categorization.

27. A method as in claim 1, further comprising the step of determining a score for each visual image, wherein the score is based on the quality evaluation.

28. A method as in claim 27, wherein the step of automatically selecting one or more visual images further comprises the step of automatically selecting the one or more visual images based on the scores.

29. A method as claim 27, further comprising the step of automatically evaluating the content of each visual image in the collection of visual images, and wherein the visual image scores are further based on the content evaluation.

30. A method as in claim 27, further comprising the step of automatically evaluating the position of each visual image in the collection of visual images, and wherein the visual image scores are further based on the position evaluation.

31. A method as in claim 27, further comprising the steps of:
automatically evaluating the position of each visual image in the collection of visual images; and
categorizing the visual images, wherein the visual image categorization is based on the position evaluation.

32. A method as in claim 31, wherein the step of automatically selecting one or more visual images further comprises the step of selecting the one or more visual images based on the scores and the categorizations.

33. A method as in claim 1, further comprising the steps of:
extracting the selected visual images from a first version of the collection of visual images; and
presenting the extracted visual images to a user together with a second version of the collection of visual images, wherein the first version of the collection of visual images is of better image quality than the second version of the collection of visual images.

34. A method as in claim 33, wherein the step of presenting further comprises the step of storing the extracted visual images on a data storage medium or media together with the second version of the collection of visual images.

35. A method as in claim 33, further comprising the step of processing the first version of the collection of visual images to produce the second version of the collection of visual images.

36. A method as in claim 1, further comprising the steps of:
extracting a first version of the selected visual images from the collection of visual images;
processing the first version of the selected visual images to produce a second version of the selected visual images, wherein the second version of the selected visual images is of better image quality than the first version of the selected visual images; and
presenting the second version of the selected visual images to a user together with the collection of visual images.

37. A method as in claim 36, wherein the step of presenting further comprises the step of storing the second version of the selected visual images of a data storage medium or media together with the collection of visual images.

38. A method as in claim 1, further comprising the steps of:
extracting the selected visual images from the collection of visual images; and
presenting the extracted visual images to a user.

39. A method as in claim 38, wherein the step of presenting further comprises the step of storing the extracted visual images on a data storage medium or media.

40. A method as in claim 1, further comprising the steps of:
creating indices that identify the locations of the selected visual images in the collection of visual images; and
presenting the indices to a user together with the collection of visual images.

41. A method as in claim 40, wherein the step of presenting further comprises the step of storing the indices on a data storage medium or media together with the collection of visual images.

42. A method as in claim 40, further comprising the step of enabling the user to browse the collection of visual images using the indices.

43. A method as in claim 42, further comprising the step at enabling the user to modify the indices by substituting an identification of a new visual image for an identification of a selected visual image.

44. A method as in claim 1, wherein the step of automatically evaluating the quality of each visual image further comprises the step of automatically evaluating the amount of energy within each visual image.

45. A system for automatically selecting one or more visual images from a collection of visual images, comprising:
means for automatically evaluating the quality of each visual image in the collection at visual images; and
means for automatically selecting one or more visual images from the collection of visual images, wherein the selection is based only on the evaluation of the quality of each visual image in the collection.

46. A computer readable medium or media encoded with one or more computer programs for automatically selecting one or more visual images from a collection of visual images, comprising:
instructions for automatically evaluating the quality of each visual image in the collection of visual images; and
instructions for automatically selecting one or more visual images from the collection of visual images, wherein the selection is based only on the evaluation of the quality of each visual image in the collection.

* * * * *